(12) United States Patent
Huang et al.

(10) Patent No.: US 8,781,901 B2
(45) Date of Patent: Jul. 15, 2014

(54) SYSTEM AND METHODS FOR PROTECTING THE PRIVACY OF USER INFORMATION IN A RECOMMENDATION SYSTEM

(75) Inventors: Vincent Huang, Sollentuna (SE); Jonas Bjork, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/513,676

(22) PCT Filed: Dec. 4, 2009

(86) PCT No.: PCT/IB2009/007656
§ 371 (c)(1),
(2), (4) Date: Jun. 4, 2012

(87) PCT Pub. No.: WO2011/067620
PCT Pub. Date: Jun. 9, 2011

(65) Prior Publication Data
US 2012/0246736 A1     Sep. 27, 2012

(51) Int. Cl.
*G06F 21/00* (2013.01)
*G06F 21/62* (2013.01)

(52) U.S. Cl.
CPC .................................. *G06F 21/6254* (2013.01)
USPC ........... 705/14.66; 726/26; 713/189; 707/756

(58) Field of Classification Search
CPC .................................................. G06F 21/6254
USPC ...................................................... 726/6, 26
See application file for complete search history.

(56) References Cited

U.S. PATENT DOCUMENTS

| 7,797,725 B2 * | 9/2010 | Lunt et al. ......................... 726/1 |
| 2002/0188589 A1 | 12/2002 | Salmenkaita et al. |
| 2006/0036640 A1 * | 2/2006 | Tateno et al. ................. 707/102 |
| 2007/0188715 A1 * | 8/2007 | Inazumi ......................... 353/30 |
| 2009/0254971 A1 * | 10/2009 | Herz et al. ....................... 726/1 |

FOREIGN PATENT DOCUMENTS

| GB | 2448480 A | 10/2008 |
| WO | 2009087613 A2 | 7/2009 |

OTHER PUBLICATIONS

Oliveira, et al., "Privacy Preserving Clustering by Data Transformation", Proc. of the 18th Brazilian Symposium on Databases, Oct. 2003, 15 pages.

Oliveira, et al., "Achieving Privacy Preservation When Sharing Data for Clustering", Workshop on Secure Data Management in conjunction with VLDB 2004, Toronto, Canada, Springer Verlag LNCS 3178, Aug. 2004, 16 pages.

(Continued)

*Primary Examiner* — Hadi Armouche
*Assistant Examiner* — Bryan Wright
(74) *Attorney, Agent, or Firm* — Rothwell, Figg, Ernst & Manbeck, P.C.

(57) ABSTRACT

The invention provides an improved recommender system that includes a client device or service provider server, a trusted function handler module and a recommender module. The recommender system functions to protect the privacy of user rating information maintained by the node (i.e., client device/server) by having the node transform the user rating information using a specific function selected by the function handler and then provide the transformed user rating information to the recommender module. In this way, privacy of the user rating information is maintained because the original user rating information will be unknown to a recommender module.

23 Claims, 9 Drawing Sheets

(56) References Cited

OTHER PUBLICATIONS

Parameswaran, et al., "Privacy Preserving Collaborative Filter Using Data Obfuscation", IEEE International Conference on Granular Computing, 2007, pp. 380-386.

Oliveira, et al., "Geometric Data Transformation for Privacy Preserving Clustering", URL: http://citeseerx.ist.psu.edu/viewdoc/download?doi=10.1.1.2.76&rep=rep1&type=pdf, May 2003, 18 pages, XP002714873.

Supplementary European Search Report from corresponding application EP09851810 dated Oct. 28, 2013, 7 pages.

* cited by examiner

SYSTEM AND METHODS FOR PROTECTING THE PRIVACY OF USER INFORMATION IN A RECOMMENDATION SYSTEM

CROSS REFERENCE TO RELATED APPLICATION(S)

This application is a 35 U.S.C. §371 National Phase Entry Application from PCT/IB2009/007656, filed Dec. 4, 2009, designating the United States, the disclosure of which is incorporated by reference herein in its entirety.

TECHNICAL FIELD

The invention relates to systems and methods for protecting the privacy of user information in a recommendation system.

BACKGROUND

A recommendation system uses information filtering techniques to select items that are likely to be of interest to a particular user. One such technique used by recommendation systems is collaborative filtering. Collaborative filtering systems usually take two steps: (1) determine a set of users who share the same rating profile with the particular user and (2) use ratings from those like-minded users found in step 1 to calculate a prediction for the selected user. In a collaborative filtering system, the users can be represented by a vector in an n-dimensional space, where n is the number of items in the recommendation system. Likewise, the items can be represented by a vector in an m-dimensional space, where m is the number of users in the recommendation system.

To determine a set of users who are similar to a particular user, the recommendation system can compare the vector associated with the particular user to each other vector associated with another user. That is, the recommendation system can find correlations among vectors. Cosine correlation and Pearson correlation are two traditional vector correlation techniques. Vectors can be "massaged" in several different ways (e.g., vectors may be shifted or scaled) prior to using the vectors to finding similarities between vectors.

A problem with recommendation systems is that they require knowledge of a user's explicit or implicit preferences (e.g., a user's item ratings vector). Some users may be wary of providing such preference information to a third party. Accordingly, what is desired is a system and method for protecting the privacy of user information in a recommendation system.

SUMMARY

The invention provides an improved recommender system that includes a client device or service provider server, a trusted function handler module and a recommender module. The recommender system functions to protect the privacy of user rating information maintained by the client device/service provider server (hereafter "node") by having the node transform the user rating information using a specific function selected by the function handler and then provide the transformed user rating information to the recommender module. In this way, privacy of the user rating information is maintained because the original user rating information will be unknown to a recommender module.

Accordingly, in one aspect, the invention provides a node apparatus configured to protect the privacy of user rating information. In one embodiment, the node apparatus includes a storage medium storing the user rating information. The user rating information may contain or consists of explicit and/or implicit user preference information. The node apparatus further includes one or more network interfaces for receiving and transmitting data via a network and a data processing system operatively connected to the storage medium and at least one of the one or more network interfaces. Advantageously, the data processing system is arranged to (a) use one of the network interfaces to receive from the function handler linear transformation information identifying a linear transformation (e.g., the linear transformation information may be or include a transformation matrix representing a vector rotation, reflection, and/or scaling); (b) apply, to the user rating information, the linear transformation identified by the linear transformation information received from the function handler to produce transformed user rating information, and (c) use one of the network interfaces to transmit the transformed user rating information towards the recommender module.

In some embodiments, the data processing system is further arranged to generate a user vector based on the user rating information and apply the linear transformation to the user rating information by applying the linear transformation to the user vector, thereby producing a transformed user vector such that the transformed user rating information comprises the transformed user vector. If the received linear transformation information identifies a vector rotation, the data processing system will apply the linear transformation to the user vector by rotating the user vector by the identified vector rotation. For example, the linear transformation information received from the function handler may be a transformation matrix corresponding to a vector rotation, and the step of rotating the user vector by the identified vector rotation consists of multiplying the user vector by the transformation matrix corresponding to the vector rotation to produce the transformed user vector.

In some embodiments, the data processing system is further arranged such that, in response to the apparatus receiving from the recommender recommendation information, the data processing system is arranged to apply to the recommendation information an inverse of the linear transformation identified by the received linear transformation information. The recommendation information may be a recommendation vector. Thus, the step of applying to the recommendation information the inverse of the linear transformation may include rotating the recommendation vector by an amount identified by the received linear transformation information. For example, if the linear transformation information is a transformation matrix, then the step of applying to the recommendation information the inverse of the linear transformation may include multiplying the recommendation information by the inverse of the transformation matrix.

In another aspect, the invention provides a function handler apparatus for use in protecting the privacy of user information. In some embodiments, the function handler includes one or more network interfaces for receiving data via a network and transmitting data via the network, and a data processing system operatively connected to the network interface. Advantageously, the data processing system may be arranged to: use one of the network interfaces to transmit first linear transformation information (e.g., a first transformation matrix) identifying a first linear transformation to a first node (e.g., a client device or service provider server); use one of the network interfaces to transmit second linear transformation information (e.g., a second transformation matrix) identifying a second linear transformation different from the first linear transformation to a second node; and use one of the network interfaces to transmit to a recommender information identifying a difference between the first linear transformation and the second linear transformation. The information identifying the difference between the first linear transformation and the second linear transformation may be a third transformation matrix. The first linear transformation information may identify a first vector rotation, and the second linear transformation information may identify a second vector rotation. Thus, the information identifying the difference between the first linear transformation and the second linear transformation may identify the difference between the first vector rotation and the second vector rotation. In some embodiments, the data processing system is configured to use one of the network interfaces to transmit the first linear transformation information to a node only in response to receiving a request from the node. That is, when the function handler receives a request from a node, the function handler may select a linear transform for the node and transmit to the node information identifying the selected transform. The selection of the transform may be based on one or more parameters included in the request. That is, the data processing system may be arranged to select the linear transformation using one or more parameters included in the request. The parameters may include one or more of a recommendation accuracy parameter and a privacy level parameter.

In yet another aspect, the invention provides a recommender for use in protecting the privacy of user information. In some embodiments, the recommender includes a network interface operable to receive data via a network and transmit data via the network; and a data processing system operatively connected to the network interface. Advantageously, the data processing system may be arranged to: (i) transform a first transformed user vector received from a first node using difference information (e.g., a transformation matrix) received from a function handler to produce a further transformed user vector, (ii) perform a user similarity procedure by comparing a second transformed user vector received from a second node with the further transformed user vector, and (iii) use the network interface to provide a result of the user similarity procedure to the first node and/or the second node. The difference information identifies a difference between a first linear transformation used to create the first transformed user vector and a second linear transformation used to create the second transformed user vector. Preferably, the second linear transformation is different than the first linear transformation. The linear transformations may be vector rotations and the difference information identifying the difference between the transformations identifies the difference between the first vector rotation and the second vector rotation. Advantageously, the data processing system may be further arranged to use the further transformed user vector to select an item to recommend to the user associated with the first transformed user vector, and use a network interface to transmit to the first node information (e.g., a recommendation vector) pertaining to the selected item.

In yet another aspect, the invention provides a method performed by the recommendation system. In some embodiments, the method begins with a node storing user rating information pertaining to one or more users. Next, the node transmits a request to the function handler, which receives the request. Next, in response to receiving the request, the function handler selects a linear transformation and transmits to the node linear transformation information identifying the selected linear transformation. The node then receives this linear transformation information and applies the linear transformation identified by the received linear transformation information to the user rating information to produce transformed user rating information. Next, the node transmits the transformed user rating information towards the recommender, which receives the transformed user rating information. The recommender uses the transformed user rating information to perform a similarity procedure. Next, the recommender transmits to the node a result of the similarity procedure. In some embodiments, the user rating information consists of one or more user vectors associated with explicit and/or implicit user preference information, and the linear transformation information transmitted to the node by the function handler is a transformation vector corresponding to a vector rotation, reflection, and/or scaling. When the user rating information includes user vectors and the linear transformation information identifies a vector rotation, the node rotates the user rating information (i.e., user vector(s)) by the vector rotation identified by the linear transformation information. In some embodiments, the linear transformation information includes a transformation matrix that identifies a vector rotation and the node is configured to rotate the user vector(s) by the identified vector rotation by multiplying the user vector(s) by the transformation matrix.

In some embodiments, the method further includes: storing second user rating information in a storage medium accessible to a second node; transmitting, from the second node to the function handler, a second request; in response to receiving the second request, selecting a second linear transformation and transmitting to the second node second linear transformation information identifying the second linear transformation; applying the second linear transformation identified by the received second linear transformation information to the second user rating information to produce second transformed user rating information; transmitting, from the second node to the recommender, the second transformed user rating information; transmitting, from the function handler to the recommender, difference information identifying a difference between the first linear transformation and the second linear transformation; transforming the second transformed user rating information using the difference information to produce further transformed user rating information; performing, at the recommender, a user similarity procedure using the first transformed user rating information and the further transformed user rating information; and transmitting, from the recommender to the first node and/or the second node, a result of the user similarity procedure.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
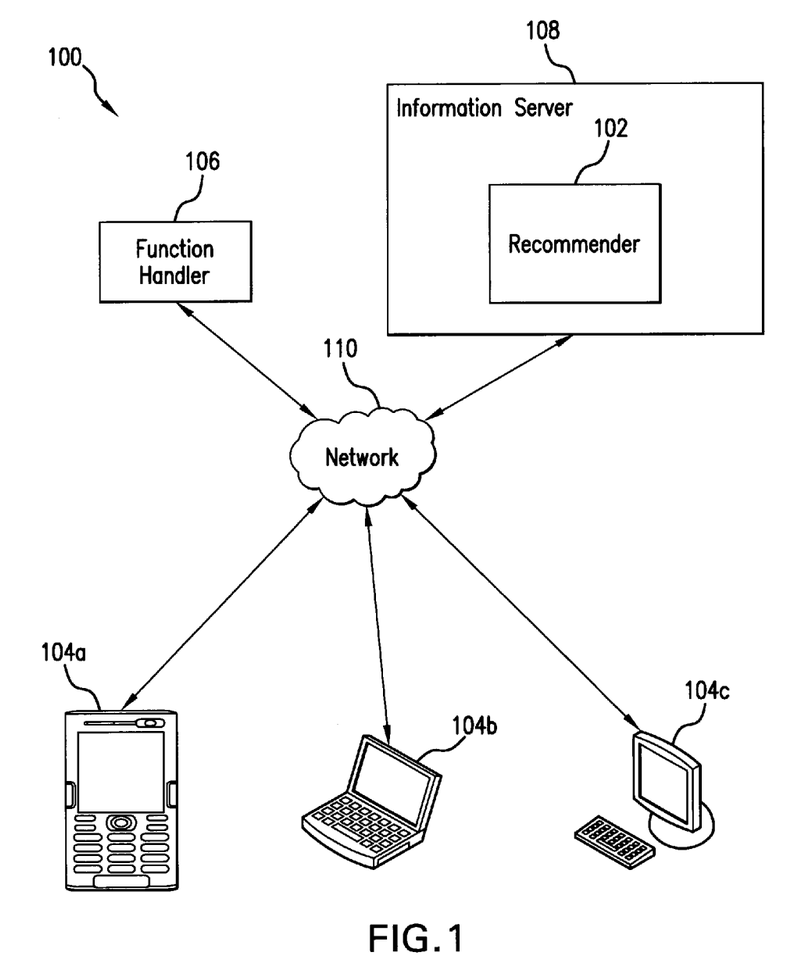
FIGS. 1-2 illustrate a recommendation system according to different embodiments of the invention.

Referring now to FIG. 1, FIG. 1 illustrates a recommendation system 100 according to a first embodiment of the invention. As shown in FIG. 1, recommendation system 100 includes a recommender module 102, a function handler module 106, and one or more client devices 104 (e.g., mobile phone 104a, laptop computer 104b, desktop computer 104c or other client device). Also, system 100 includes one or more networks 110 for enabling communication among recommender 102, function handler 106 and client devices 104.

As illustrated in FIG. 1, recommender 102 may be a component of an information server 108 for serving documents to be consumed by the users of client devices 104. As used herein, the term "document" means any item of information or set of information. Examples of "documents" include, but are not limited to, news articles, advertisements, web pages, books, and product information. Accordingly, information server 108 may be or include any one of the following: a news server, an advertising server, a web server, etc. Information server 108 may consist of a single, stand-alone server computer or a set of server computers that may be co-located or geographically dispersed.

In some embodiments, recommender 102 functions to select a document to provide to a requesting user. Additionally or alternatively, recommender 106 may function to select which users will be provided with a particular document. In other embodiments, recommender 102 may merely perform user clustering procedures to identify a set of user that are "similar" to a given, particular user.

In the embodiment shown, a client device 104 may store a user's rating information (e.g., information identifying a user's explicit or implicit preferences). A user of the client may be hesitant to provide this rating information to information server 108 even though the user desires to utilize the services of recommender 102. The reason for this is that the user may not trust information server 108 to adequately protect the user's rating information, which the user may regard as containing highly private information.

Figure 2:
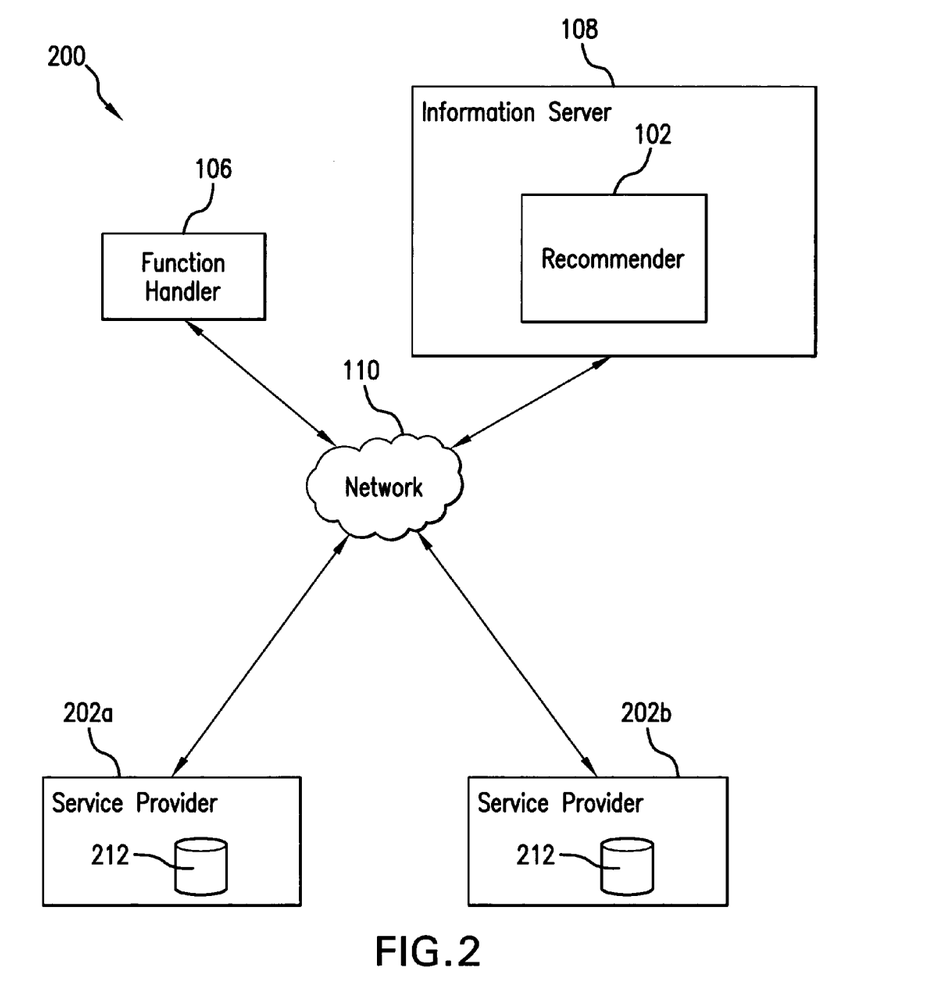

Referring now to FIG. 2, FIG. 2 illustrates a recommendation system 200 according to a second embodiment of the invention. As shown in FIG. 2, recommendation system 100 includes recommender module 102, function handler module 106, and one or more service provider servers 202. Also, system 200 includes one or more networks 110 for enabling communication among recommender 102, function handler 106 and servers 202. Like client devices 104 in system 100, servers 202 in system 200 may store, for each of a number of users, rating information 212 associated with the user (e.g., information identifying the user's explicit or implicit preferences). These users, like the users of client devices 104, may be hesitant to allow a server 202 to provide private rating information to information server 108.

Because the users of client devices 104 and servers 202 may desire to protect their rating information, a trusted third party entity (i.e., function handler 106) is introduced to protect such private information. Function handler 106 is configured to provide to client devices 104 and servers 202 transformation information identifying a transformation (e.g., a linear transformation). The transformation information may be in the form of a transformation matrix that identifies the linear transformation by representing the linear transformation. Function handler 106 may provide such information (e.g., matrix) upon request (i.e., client devices 104/server 202 may "pull" the information from function handler 106) and/or function handler 106 may push such information to client devices 104/server 202 on a periodic basis (i.e., function handler 106 may transmit such information to a client device 104/server 202 without waiting for a request from the client device/server).

After receiving this linear transformation information from function handler 106, a client device 104/server 202 applies to the user rating information that it maintains the linear transformation identified (e.g., represented) by the linear transformation information received from function handler 106 to, thereby, producing transformed user rating information. This transformed user rating information is then provided to recommender 102 so that recommender 102 may use the transformed user rating information to perform a user similarity procedure (e.g., a user clustering operation) to determine, for example, a set of users that are similar to a particular user so that a recommendation can be made to the particular user. Advantageously, recommender 102 is not informed as to the transformation(s) that was/were used to transform the user rating information. In this way, a user's private information can be kept private, while at the same time providing recommender 102 with sufficient information to determine user clusters.

In some embodiments, prior to applying the transformation to the user rating information that it maintains, client device 104/server 202 may use the user rating information to generate a user vector for each user for which client device 104/server 202 maintains user rating information. Typically, client device 104 maintains user rating information for only a single user, and, thus, generates a single user vector from the user rating information that it maintains. Server 202, on the other hands, may store user rating information for each of a number of users, and, thus, generates a user vector for each particular user from the particular user's rating information. In any event, client device 104/server 202 may apply the transform to the user rating information by applying the transform to each user vector that it generates, thereby producing transformed user vectors, which are then provided to recommender 102. As is known in the art, recommender 102 uses the transformed user vectors to, for example, cluster users. From the perspective of recommender 102, the transformed user vectors are no different than non-transformed user vectors.

In some embodiments, the linear transformation information provided by function handler 106 identifies one or more of: a vector rotation, reflection, and scaling. In some embodiments, the linear transformation information provided by function handler 106 identifies a vector rotation, reflection, or scaling by containing a transformation matrix corresponding to the vector rotation, reflection, or scaling. In embodiments where the linear transformation information provided by function handler 106 identifies a vector rotation, client device 104/server 202 are configured to apply the linear transformation to a user vector by rotating the user vector by the identified vector rotation. That is, client device 104/server 202 may configured to rotate the user vector by multiplying the user vector by the transformation matrix.

If all of the user vectors that are used by recommender 102 to perform the user similarity procedure are transformed using the same linear transformation, then recommender 102 need not receive any additional information to successfully perform the user similarity procedure. This may be the case where server 202a, for example, receives a linear transform from function handler 106, uses the received linear transform to transform user vectors for each of its users, provides the transformed user vectors to recommender 102, and requests recommender 102 to use only the received transformed user vectors to cluster the users.

If, however, not all of the user vectors are transformed using the same transformation, then recommender 102 should receive additional information (e.g., information from function handler) to successfully perform the user similarity procedure. This may be the case where servers 202a and 202b receive different transforms from function handler 106, and recommender 102 is requested to cluster users using both server 202a's transformed user information and server 202b's transformed user information. More specifically, recommender 102 should receive (e.g., from function handler 106) difference information identifying a difference between the transform used by server 202a and the transform used by server 202b.

As described above, in some embodiments, the transform used by servers 202 are vector rotations. Thus, in these embodiments, the difference information received at recommender 102 identifies the difference between the vector rotation used by server 202a and the vector rotation used by server 202b. Recommender 202 uses this difference information to rotate either the transformed user vectors received from server 202a or the transformed user vectors received from server 202b by the difference. So, for example in a two-dimensional space, if server 202a rotated its vectors by 90 degrees and server 202b rotated its vectors by 120 degrees, then recommender 102 will be notified of this difference (i.e., 30 degrees), and recommender 102 will either rotate server 202a's vectors an additional 30 degrees or rotate server 202b's vectors back 30 degrees before comparing the user vectors to find similarities.

Figure 3:
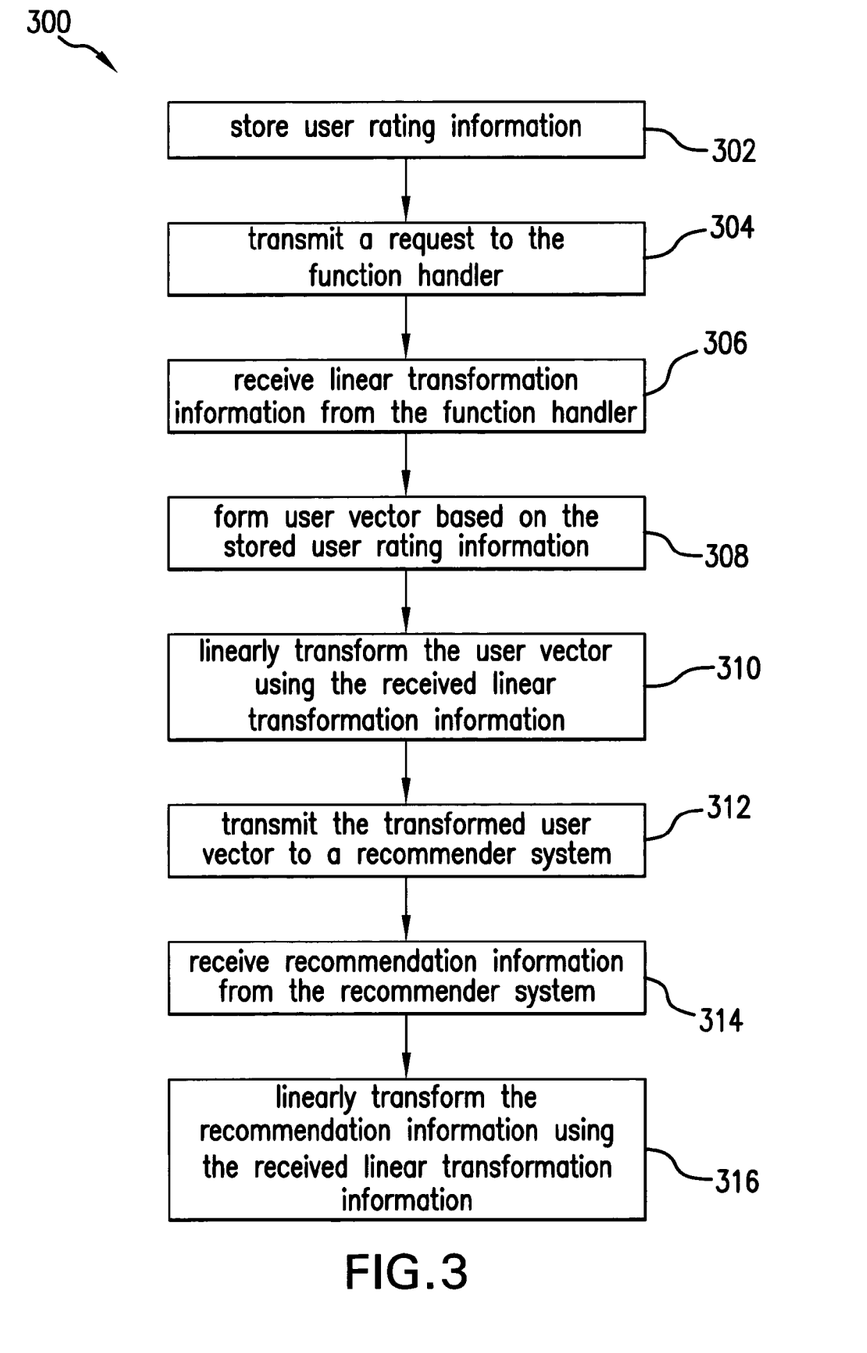
FIGS. 3-5 are flow charts illustrating various processes according to embodiments of the invention.

Referring now to FIG. 3, FIG. 3 is a flow chart illustrating a process 300 performed by a node (e.g., client device 104 or service provider server 202) for protecting the privacy of user information. Process 300 may begin in step 302, where user rating information is stored. Next (step 304), the node transmits a request to function handler 106 for transformation information. For example, the node may be configured to transmit such a request on a periodic bases (e.g., once per day). Next (step 306), the node receives linear transformation information from function handler 106. The linear transformation information identifies a linear transformation (e.g., a particular vector rotation). Next (step 308), the node forms one or more user vector based on the stored user rating information. In some embodiments, step 308 may occur prior to step 304.

Next (step 310), the node linearly transforms the user vector(s) using the received linear transformation information to produce a transformed user vector or vectors. For example, if the linear transformation identifies a particular vector rotation, then the node will rotate each user vector by the identified vector rotation. Next (step 312), the node transmits the transformed user vector(s) to recommender 102 (e.g., by transmitting the vector(s) to information server 108, which ten provides the vector(s) to recommender 102). Next (step 314), the node receives recommendation information (e.g., a recommendation vector) produced by recommender 102. In some embodiments, the recommendation information needs to be linearly transformed in order to provide meaningful information. Thus, in step 316, the node linearly transforms the recommendation information using the linear transformation information received from function handler 106. More specifically, the node applies to the recommendation information received from recommender 102 the inverse of the linear transformation identified by the linear transformation information received from function handler 106. Thus, for example, if the recommendation information is a vector and the linear transformation identified by the linear transformation information received from function handler 106 is a vector rotation of X degrees in a particular direction, then the node will rotate the recommendation vector by X degrees in a direction opposite of the particular direction.

In the above manner, the privacy of the user rating information stored by the node is protected because the recommender 102 does not receive the actual user rating information. Rather, recommender 102 receives only transformed user rating information. Further, recommender 102 has no knowledge of the inverse transform and, thus, can not recreate the actual user rating information. In this manner, the user rating information remains advantageously hidden from recommender 102.

Figure 4:
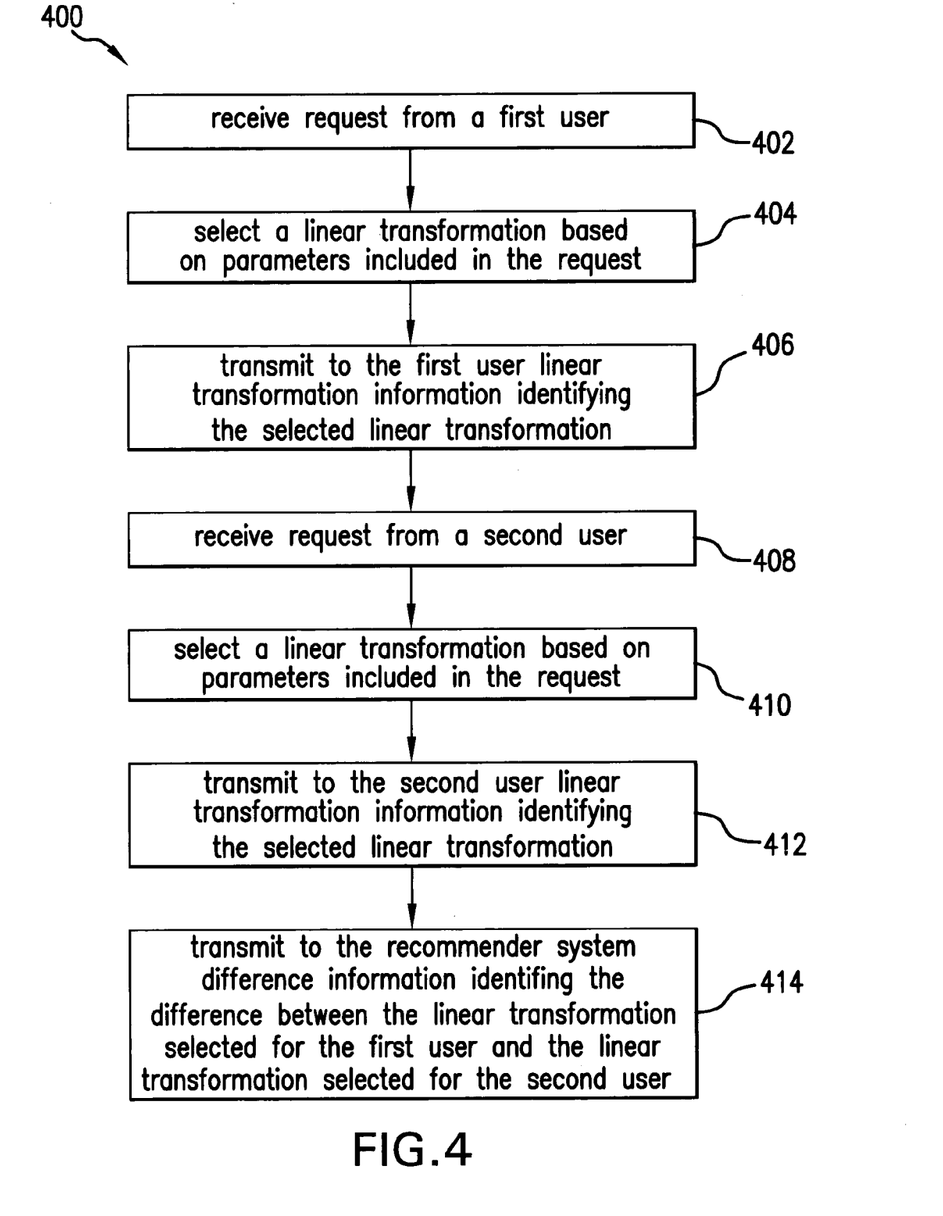

Referring now to FIG. 4, FIG. 4 is a flow chart illustrating a process 400 performed by function handler 106 for protecting the privacy of user information. Process 400 may being in step 402, where function handler 106 receives from a first node (e.g., client node 104a or service provider node 202a) a request message indicating that the first node desires to receive linear transformation information identifying a linear transformation (e.g., a vector rotation). The request message may include parameters such as, for example, a recommendation accuracy parameter and/or a privacy level parameter (e.g., a value indicating a privacy level). Next (step 404), function handler 106 selects a linear transformation in response to the request message. The selection may be based on parameters included in the request message. For example, certain linear transformations may provide more protection than other transformations. Thus, if the request message includes a privacy level parameter that indicates a high degree of privacy is required, then function handler 106, in step 404, will select in response to the request message a linear transformation that provides a relatively higher degree of privacy.

Next (step 406), function handler 106 transmits to the first node linear transformation information identifying the selected linear transformation. Next (step 408), function handler 106 receives from a second node (e.g., client node 104b or service provider node 202b) a request message indicating that the second node desires to receive linear transformation information identifying a linear transformation. Next (step 410), in response to this second request message, function handler 106 selects another, different, linear transformation. Next (step 412), function handler 106 transmits to the second node linear transformation information identifying the linear transformation selected in step 410. Next (step 414), function handler 106 transmits to recommender difference information that identifies the different between the linear transformation selected for the first node and the linear transformation selected for the second node. As described herein, recommender 102 requires this difference information in order to compare user rating information transformed by the first node using the linear transform selected in step 404 with user rating information transformed by the second node using the linear transform selected in step 410.

Figure 5:
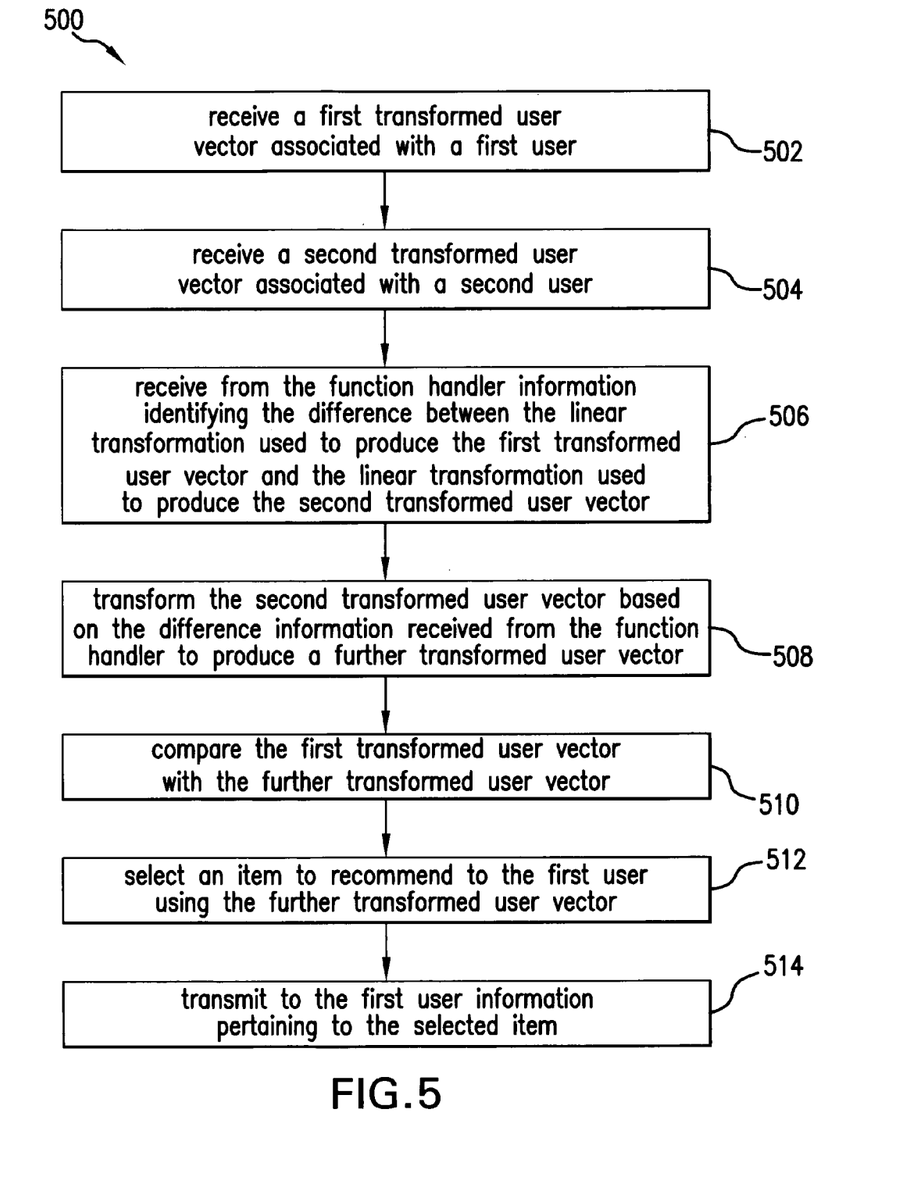

Referring now to FIG. 5, FIG. 5 is a flow chart illustrating a process 500 performed by recommender 102. Process 500 may being in step 502, where recommender 102 receives from a first node (e.g., client device 104a or service provider server 202a) transformed user rating information (e.g., a transformed user vector associated with a first user). Next (step 504), recommender 102 receives from a second node (e.g., client device 104a or service provider server 202a) transformed user rating information (e.g., a transformed user vector associated with a second user). In step 506, recommender 102 receives from function handler 106 difference information that identifies the different between (i) the linear transformation used by the first node to transform the user rating information received in step 502 and (ii) the linear transformation used by the second node to transform the user rating information received in step 504. In step 508, recommender 102 uses the difference information received in step 506 to further transform the transformed user rating information received in step 504 to produce further transformed user rating information (e.g., to produce a further transformed user vector). Alternatively, recommender 102 could further transform the transformed user rating information received in step 502. For example, as discussed above, the difference information may identify a vector rotation and, in step 508, recommender 102 may rotate the transformed user vector associated with the second user by the identified vector rotation.

Next (step 510), recommender 102 performs a user similarity procedure using the transformed user rating information received in step 502 and the further transformed user rating information produced in step 508. For example, in step 510, recommender 102 may compare the transformed user vector associated with the first user with the further transformed user vector. Next (step 512), using the results of the user similarity procedure (which may be the identification of a set of user that are similar to the first user), recommender 102 selects an item to recommend to the first user. Next (step 514), recommender 102 transmits to the first node information pertaining to the selected item. This information may be in the form of a vector. As discussed above, the first node may need to transform this vector in order to determine the selected item.

Figure 6A:
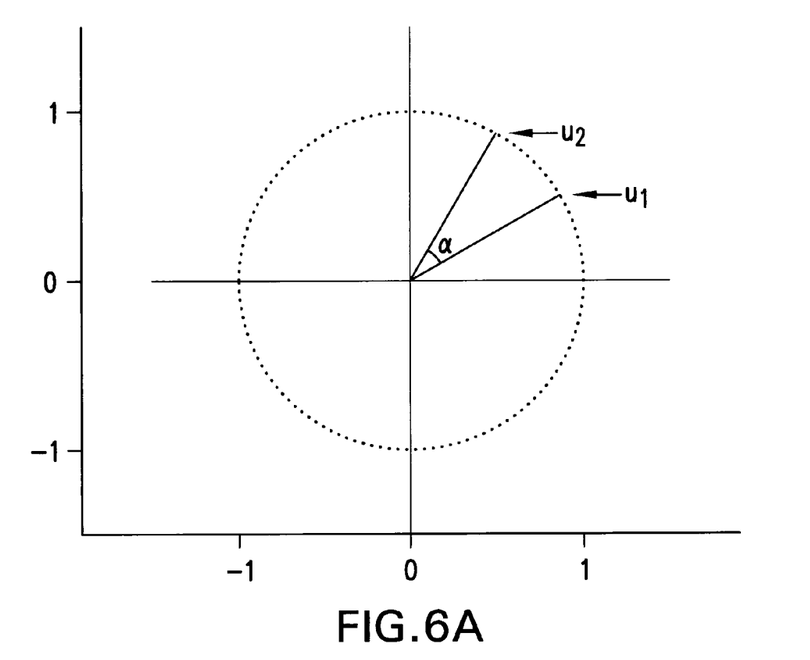
FIG. 6 illustrates a vector transformation.
Figure 6B:
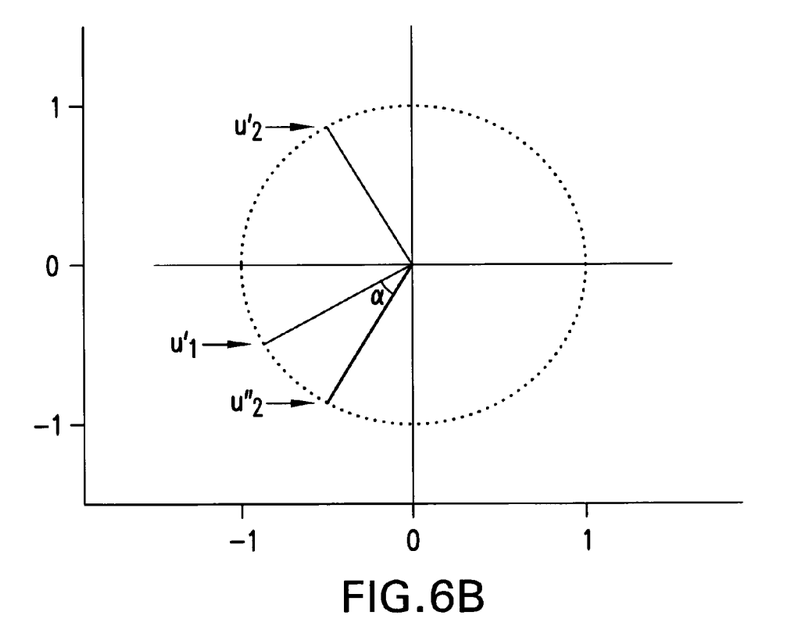

Referring now to FIGS. 6A and 6B, these figures illustrate vector rotations in a two-dimensional space. More specifically, FIG. 6A shows two, un-transformed user vectors, user vector u1 and user vector u2. As shown in FIG. 6A, the angle between these two vectors is α. User vector u1 may be a vector maintained by server provider server 202a, whereas vector u2 may be a vector maintained by server provider server 202b. Thus, these two vectors may be transformed by different transformation matrixes prior to being provided to recommender 102. This is illustrated in FIG. 6B, which shows vectors u1 and u2 after being transformed (i.e., rotated in this case). Because the same transform was not applied to both vectors, any comparison of the transformed vector u1 to the transformed vector u2 will not produce an accurate result. This is why recommender 102 needs to know the difference between the transforms applied to the vectors. Once recommender 102 knows this difference, then recommender 102 can further transform one of the received transformed vectors. This is also shown in FIG. 6B, which shows the transformed vector u2 being further transformed (i.e., further rotated in this case). As further shown in FIG. 6B, after the further transformation of transformed vector u2, the angle between transformed vector u1 and further transformed vector u2 is again α. Now recommender 102 can accurately compare the two vectors, but at the same time have no knowledge of un-transformed user vectors, user vector u1 and user vector u2. Thus, user privacy can be maintained while recommender 102 can still function as normal.

Figure 7:
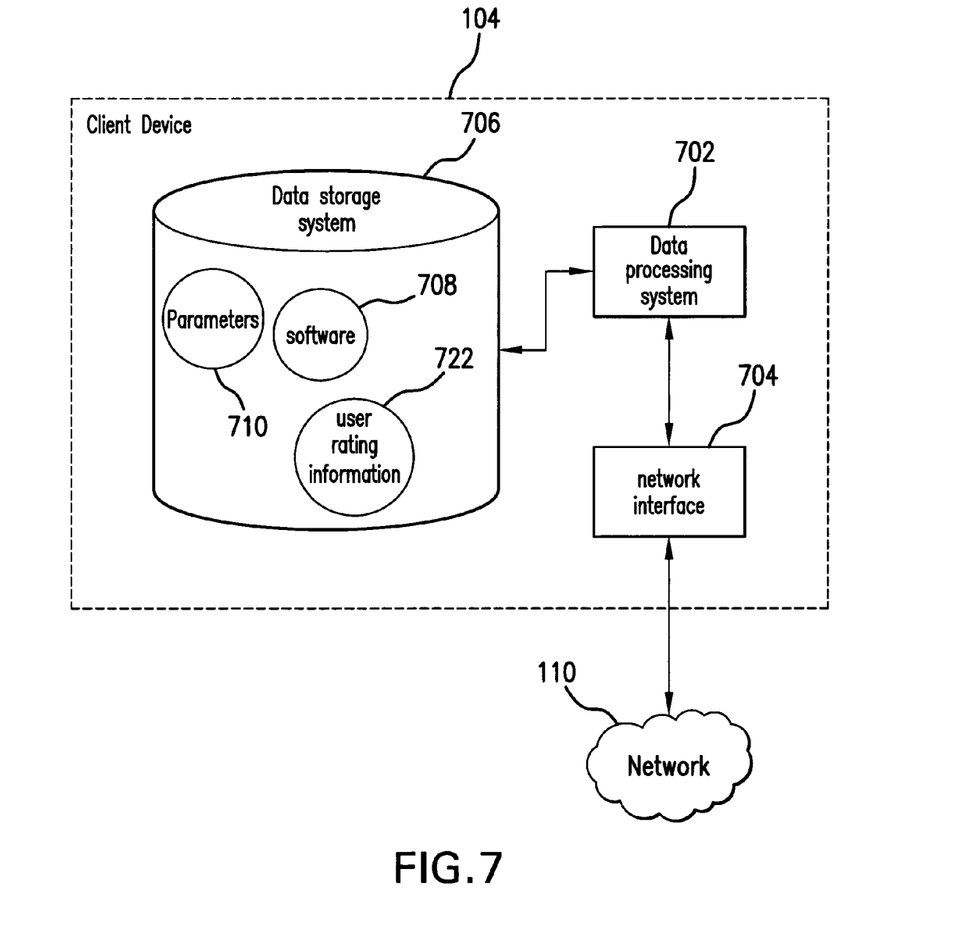
FIG. 7 is a functional block diagram of a client device according to embodiments of the invention.

Referring now to FIG. 7, FIG. 7 illustrates a functional block diagram of a client device 104 or service provider server 202 (hereafter "node") according to some embodiments. As shown in FIG. 7, the node may comprise a data processing system 702 (e.g. one or more microprocessors, one or more integrated circuits, such as an application specific integrated circuit (ASIC), Field-programmable gate arrays (FPGAs), etc. and any combination of these), a data storage system 706 (e.g. one or more non-volatile storage devices) and computer program 708 (i.e., software) stored on the storage system 706. For example, the computer program 708 may be stored using a computer readable means, such as, but not limited, to magnetic media (e.g., a hard disk), optical media (e.g., a DVD), memory devices (e.g., random access memory), etc. Configuration parameters 710 may also be stored in storage system 706 (e.g., recommendation accuracy parameters and/or privacy level parameters). The node may also be coupled to (or include) a network interface 704 (which may include a transmitter and receiver) for communicating with nodes in network 110 or devices connected to network 110. In some embodiments, computer program 708 is configured such that when processing system 702 executes computer program 708, processing system 702 is configured to perform steps described above (e.g., steps describe above with reference to the flow charts shown in FIG. 3. In other embodiments, data processing system 702 is configured to perform steps described above in FIG. 3 without the need for software 708. That is, for example, data processing system 702 may consist merely of one or more ASICs. Hence, the features of the present invention described above may be implemented in hardware and/or software. As further shown in FIG. 7, data storage system 706 may store user rating information.

Figure 8:
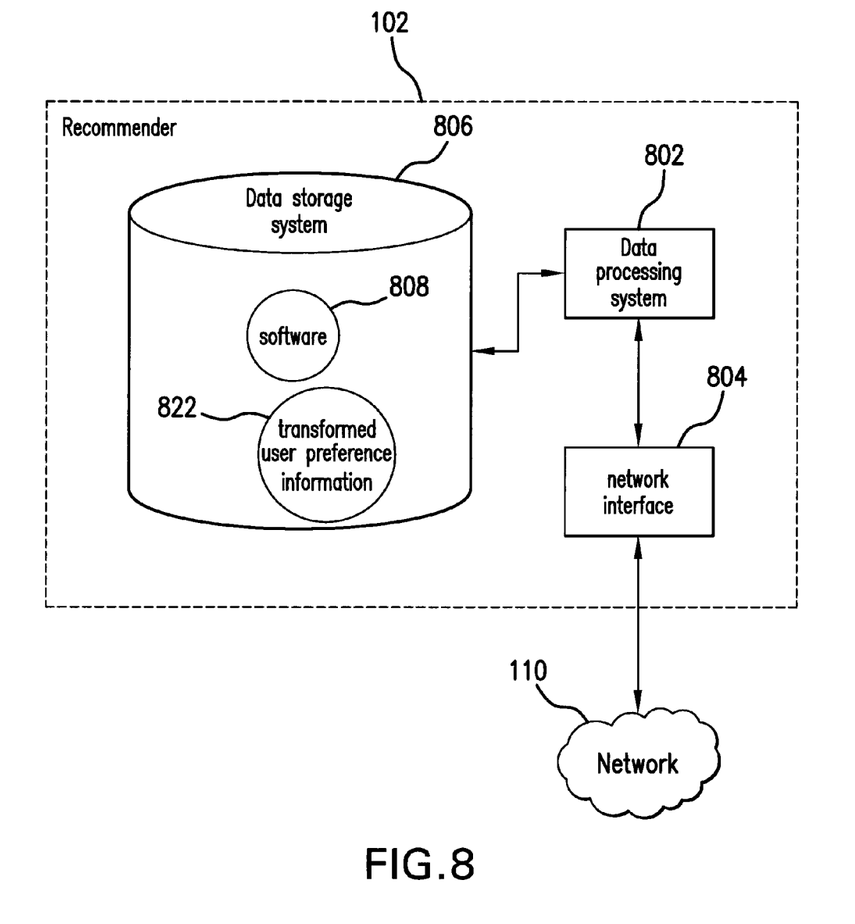
FIG. 8 is a functional block diagram of a function handler module according to embodiments of the invention.

Referring now to FIG. 8, FIG. 8 illustrates a functional block diagram of recommender 102 according to some embodiments. As shown in FIG. 8, recommender 102 may comprise a data processing system 802 (e.g. one or more microprocessors, one or more integrated circuits, such as an application specific integrated circuit (ASIC), Field-programmable gate arrays (FPGAs), etc. and any combination of these), a data storage system 806 (e.g. one or more non-volatile storage devices) and computer program 808 (i.e., software) stored on the storage system 806. For example, the computer program 808 may be stored using a computer readable means, such as, but not limited, to magnetic media (e.g., a hard disk), optical media (e.g., a DVD), memory devices (e.g., random access memory), etc. Recommender 102 may also be coupled to (or include) a network interface 804 (which may include a transmitter and receiver) for communicating with nodes in network 110 or devices connected to network 110. In some embodiments, computer program 808 is configured such that when processing system 802 executes computer program 808, processing system 802 is configured to perform steps described above (e.g., steps describe above with reference to the flow charts shown in FIG. 5. In other embodiments, data processing system 802 is configured to perform steps described above in FIG. 5 without the need for software 808. That is, for example, data processing system 802 may consist merely of one or more ASICs. Hence, the features of the present invention described above may be implemented in hardware and/or software. As further shown in FIG. 8, data storage system 806 may store transformed user rating information.

Figure 9:
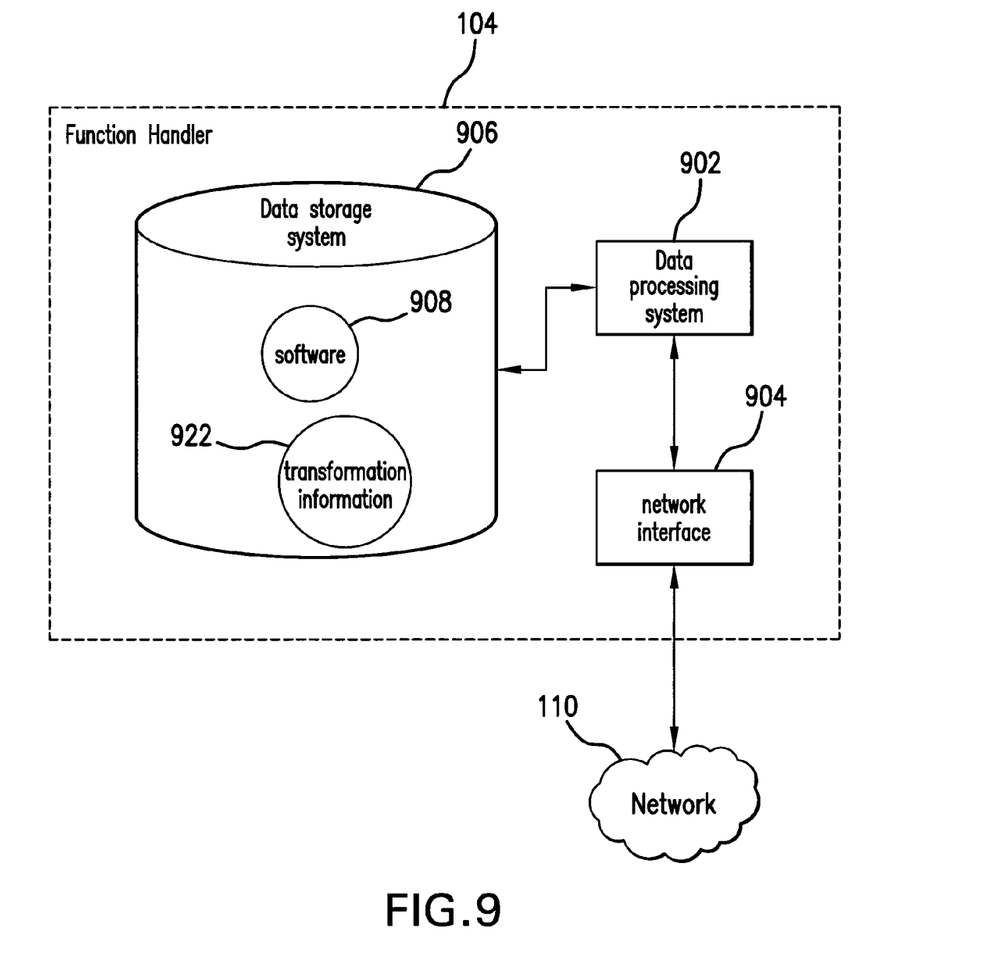
FIG. 9 is a functional block diagram of a recommender module according to embodiments of the invention.

Referring now to FIG. 9, FIG. 9 illustrates a functional block diagram of function handler 106 according to some embodiments. As shown in FIG. 9, function handler 106 may comprise a data processing system 902 (e.g. one or more microprocessors, one or more integrated circuits, such as an application specific integrated circuit (ASIC), Field-programmable gate arrays (FPGAs), etc. and any combination of these), a data storage system 906 (e.g. one or more non-volatile storage devices) and computer program 908 (i.e., software) stored on the storage system 906. For example, the computer program 908 may be stored using a computer readable means, such as, but not limited, to magnetic media (e.g., a hard disk), optical media (e.g., a DVD), memory devices (e.g., random access memory), etc. Function handler 106 may also be coupled to (or include) a network interface 904 (which may include a transmitter and receiver) for communicating with nodes in network 110 or devices connected to network 110. In some embodiments, computer program 908 is configured such that when processing system 902 executes computer program 908, processing system 902 is configured to perform steps described above (e.g., steps describe above with reference to the flow charts shown in FIG. 4. In other embodiments, data processing system 902 is configured to perform steps described above in FIG. 4 without the need for software 908. That is, for example, data processing system 902 may consist merely of one or more ASICs. Hence, the features of the present invention described above may be implemented in hardware and/or software. As further shown in FIG. 9, data storage system 906 may store transformation information.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A user information privacy protection apparatus configured to protect the privacy of user information, comprising:
    a non-transitory storage medium storing user rating information;
    one or more receivers and transmitters for receiving and transmitting user information via a network; and
    a data processor operatively connected to the storage medium and at least one of the one or more receivers and transmitters, the data processor arranged to:
    use one of the receivers to receive from a third party linear transformation information identifying a linear transformation, wherein the linear transformation is one or more of: a vector rotation and a vector reflection;
    apply, to the user rating information, the linear transformation identified by the linear transformation information received from the third party to produce transformed user rating information, and
    use one of the transmitters to transmit the transformed user rating information towards a recommender, wherein the recommender is not informed as to the transformation used to transform the user rating information.

2. The apparatus of claim 1, wherein the user rating information comprises explicit and/or implicit user information.

3. The apparatus of claim 1, wherein
    the data processor is further arranged to generate a user vector based on the user rating information and further arranged to apply the linear transformation to the user rating information by applying the linear transformation to the user vector, thereby producing a transformed user vector, and
    the transformed user rating information comprises the transformed user vector.

4. The apparatus of claim 1, wherein the received linear transformation information comprises a transformation matrix corresponding to a vector rotation and the data processor is arranged to apply the linear transformation to the user vector by multiplying the user vector by the transformation matrix, thereby rotating the user vector according to the corresponding vector rotation.

5. The apparatus of claim 1, wherein the data processor is further arranged such that, in response to the apparatus receiving from the recommender recommendation information, the data processor is arranged to apply to the recommendation information an inverse of the linear transformation identified by the received linear transformation information.

6. The apparatus of claim 5, wherein the recommendation information comprises a recommendation vector and the step of applying to the recommendation information the inverse of the linear transformation comprises rotating the recommendation vector.

7. A function handler apparatus for use in protecting the privacy of user information, comprising:
    one or more transmitters for transmitting information via the network; and
    a data processor operatively connected to the receivers and transmitters, the data processor arranged to:
    use one of the transmitters to transmit first linear transformation information identifying a first linear transformation to a first node;
    use one of the transmitters to transmit second linear transformation information identifying a second linear transformation different from the first linear transformation to a second node; and
    use one of the transmitters to transmit to a recommender information identifying a difference between the first linear transformation and the second linear transformation, wherein
    the first linear transformation information identifies a first vector rotation, and the second linear transformation information identifies a second vector rotation, and the information identifying the difference between the first linear transformation and the second linear transformation identifies the difference between the first vector rotation and the second vector rotation.

8. The function handler apparatus of claim 7, wherein the first node belongs to a first service provider and the second node belongs to a second service provider.

9. The function handler apparatus of claim 7, wherein the data processor is further arranged such that, in response to the function handler receiving a request from a node, the data processor selects a linear transformation and uses one of the network interfaces to transmit to the node linear transformation information identifying the selected linear transformation.

10. The function handler apparatus of claim 9, wherein
    the step of selecting a linear transformation comprises selecting a transformation matrix; and
    the data processor is arranged to select the transformation matrix using one or more parameters included in the request.

11. The function handler apparatus of claim 10, wherein the one or more parameters include one or more of: a recommendation accuracy parameter and a privacy level parameter.

12. A recommender apparatus for use in protecting the privacy of user information, comprising:
    a transmitter operable to transmit recommendation information via a network; and
    a data processor operatively connected to the network interface, the data processor arranged to: (i) transform a first transformed user vector received from a first node using difference information received from a function handler to produce a further transformed user vector, (ii) perform a user similarity procedure by comparing a second transformed user vector received from a second node with the further transformed user vector, and (iii) use the transmitter to transmit a result of the user similarity procedure to the first node and/or the second node, wherein the difference information identifies a difference between a first linear transformation used to create the first transformed user vector and a second linear transformation used to create the second transformed user vector, with the second linear transformation being different than the first linear transformation, wherein the first linear transformation is a first vector rotation, the second linear transformation is a second vector rotation, and the difference information identifying the difference between the first linear transformation and the second linear transformation comprises a transformation matrix corresponding to the difference between the first vector rotation and the second vector rotation.

13. The recommender apparatus of claim 12, wherein the data processor is configured to transform the first transformed user vector using the difference information by multiplying the first transformed user vector by the transformation matrix.

14. The recommender apparatus of claim 12, wherein the first node belongs to a first service provider and the second node belongs to a second service provider.

15. The recommender apparatus of claim 12, wherein the data processor is further arranged to:
use the further transformed user vector to select an item to recommend to the user associated with the first transformed user vector, and
use a network interface to transmit to the first node information pertaining to the selected item.

16. A method for protecting the privacy of user information in a system comprising a node, a function handler, and a recommender, comprising:
storing user rating information in a non-transitory storage medium accessible to the node;
transmitting, from the node to the function handler, a request;
receiving the request at the function handler;
in response to receiving the request, selecting a linear transformation and transmitting to the node linear transformation information identifying the selected linear transformation;
receiving at the node the linear transformation information transmitted by the function handler;
applying the linear transformation identified by the received linear transformation information to the user rating information to produce transformed user rating information;
transmitting, from the node to the recommender, the transformed user rating information;
receiving the transformed user rating information at the recommender;
using the transformed user rating information to perform a similarity procedure; and
transmitting, from the recommender to the node, a result of the similarity procedure.

17. The method of claim 16, wherein
the user rating information comprises a user vector associated with explicit and/or implicit user preference information, and
the linear transformation information transmitted to the node by the function handler identifies one or more of: a vector rotation, reflection, and scaling.

18. The method of claim 16, wherein
the user rating information comprises a user vector associated with explicit and/or implicit user preference information, and
the step of applying the linear transformation to the user rating information comprises multiplying the user vector by a transformation matrix identified by the linear transformation information transmitted to the node by the function handler.

19. The method of claim 16, wherein the system further comprises a second node and the method further comprises:
storing second user rating information in a storage medium accessible to the second node;
transmitting, from the second node to the function handler, a second request;
receiving the second request at the function handler;
in response to receiving the second request, selecting a second linear transformation and transmitting to the second node second linear transformation information identifying the second linear transformation;
receiving at the second node the second linear transformation information transmitted by the function handler;
applying the second linear transformation identified by the received second linear transformation information to the second user rating information to produce second transformed user rating information;
transmitting, from the second node to the recommender, the second transformed user rating information;
receiving, at the recommender, the second transformed user rating information;
transmitting, from the function handler to the recommender, difference information identifying a difference between the first linear transformation and the second linear transformation;
receiving, at the recommender, the difference information transmitted from the function handler;
transforming the second transformed user rating information using the difference information to produce further transformed user rating information;
performing, at the recommender, a user similarity procedure using the first transformed user rating information and the further transformed user rating information; and
transmitting, from the recommender to the first node and/or the second node, a result of the user similarity procedure.

20. The apparatus of claim 1, wherein the function handler is a trusted third party.

21. The function handler apparatus of claim 7, wherein the function handler apparatus is a trusted third party.

22. The recommender apparatus of claim 12, wherein the function handler is a trusted third party.

23. The method of claim 16, wherein the function handler is a trusted third party.

* * * * *